United States Patent
Amoroso et al.

(10) Patent No.: US 12,410,072 B2
(45) Date of Patent: Sep. 9, 2025

(54) NANOSTRUCTURED CERAMIC MEMBRANES FOR HYDROGEN ISOTOPE SEPARATION

(71) Applicants: BATTELLE SAVANNAH RIVER ALLIANCE, LLC, Aiken, SC (US); CLEMSON UNIVERSITY, Clemson, SC (US)

(72) Inventors: Jake W. Amoroso, Aiken, SC (US); Kyle S. Brinkman, Clemson, SC (US); Jianhua Tong, Greenville, SC (US); Jun Gao, Richland, WA (US); Yuqing Meng, Idaho Falls, ID (US); James M. Becnel, Augusta, GA (US)

(73) Assignees: Battelle Savannah River Alliance, LLC, Aiken, SC (US); Clemson University, Clemson, SC (US)

( * ) Notice: Subject to any disclaimer, the term of this patent is extended or adjusted under 35 U.S.C. 154(b) by 524 days.

(21) Appl. No.: 17/826,956

(22) Filed: May 27, 2022

(65) Prior Publication Data
US 2023/0382769 A1 Nov. 30, 2023

(51) Int. Cl.
*C02F 1/28* (2023.01)
*B01D 15/18* (2006.01)
(Continued)

(52) U.S. Cl.
CPC .......... *C02F 1/281* (2013.01); *B01D 15/1807* (2013.01); *B01D 15/1885* (2013.01);
(Continued)

(58) Field of Classification Search
None
See application file for complete search history.

(56) References Cited

U.S. PATENT DOCUMENTS

| | | | |
|---|---|---|---|
| 4,376,066 A | 3/1983 | Bruggeman et al. |
| 4,528,003 A | 7/1985 | Dittrich et al. |
| (Continued) | | |

FOREIGN PATENT DOCUMENTS

| | | | |
|---|---|---|---|
| CN | 104129758 A | 11/2014 |
| CN | 110627019 A | 12/2019 |
| (Continued) | | |

OTHER PUBLICATIONS

U.S. Appl. No. 17/877,167, filed Jul. 29, 2022, Hitchcock, et al., Hydrogen Isotope Separation Systems.
(Continued)

*Primary Examiner* — Chester T Barry
(74) *Attorney, Agent, or Firm* — Dority & Manning, P.A.

(57) ABSTRACT

Methods and systems directed to the separation of a heavy hydrogen isotope, e.g., tritium, from an aqueous stream are described. The methods and systems incorporate a separation media that includes a proton conducting ceramic that at low temperatures preferentially adsorbs heavy hydrogen isotopes and at high temperature preferentially adsorbs lighter heavy hydrogen isotopes. The methods can be temperature controlled to sequentially purify a contaminated stream and regenerate the separation media. The separation media can be free of traditional hydrogen isotope exchange catalyst materials.

20 Claims, 7 Drawing Sheets

(51) Int. Cl.
   *B01D 15/20* (2006.01)
   *B01D 71/02* (2006.01)
   *C02F 1/44* (2023.01)
   *G21F 9/12* (2006.01)

(52) U.S. Cl.
   CPC ....... *B01D 15/203* (2013.01); *B01D 71/0271* (2022.08); *C02F 1/44* (2013.01); *G21F 9/12* (2013.01); *C02F 2303/16* (2013.01)

(56) References Cited

U.S. PATENT DOCUMENTS

| | | |
|---|---|---|
| 4,781,734 A | 11/1988 | Behr et al. |
| 5,122,163 A | 6/1992 | Ide et al. |
| 5,366,712 A | 11/1994 | Violante et al. |
| 5,445,803 A | 8/1995 | Dworschak et al. |
| 5,954,968 A | 9/1999 | Patterson |
| 6,165,438 A | 12/2000 | Willms et al. |
| 6,332,914 B1 | 12/2001 | Lee |
| 6,432,174 B1 | 8/2002 | Heung |
| 6,527,833 B1 | 3/2003 | Oyama et al. |
| 6,632,367 B1 | 10/2003 | Furlong et al. |
| 6,667,100 B2 | 12/2003 | Rutherford et al. |
| 6,984,327 B1 | 1/2006 | Patterson |
| 7,001,446 B2 | 2/2006 | Roark et al. |
| 7,071,258 B1 | 7/2006 | Jang et al. |
| 7,682,494 B2 | 3/2010 | Berland et al. |
| 7,988,941 B2 | 8/2011 | Choi et al. |
| 8,632,855 B2 | 1/2014 | Wenxu et al. |
| 8,734,683 B2 | 5/2014 | Yu et al. |
| 9,005,486 B2 | 4/2015 | Brinkman |
| 9,023,550 B2 | 5/2015 | Brinkman |
| 9,056,272 B2 | 6/2015 | Farag |
| 9,225,030 B1 | 12/2015 | Huang et al. |
| 9,475,007 B2 | 10/2016 | Wilson |
| 9,527,044 B2 | 12/2016 | Wachsman et al. |
| 9,534,296 B2 | 1/2017 | McAlister |
| 9,687,775 B2 | 6/2017 | Chen et al. |
| 10,059,584 B2 | 8/2018 | Tong et al. |
| 10,305,116 B2 | 5/2019 | Tong et al. |
| 10,381,121 B2 | 8/2019 | Xiao |
| 10,436,516 B2 | 10/2019 | Heung et al. |
| 10,926,228 B2 | 2/2021 | Lozada et al. |
| 11,083,993 B2 | 8/2021 | Kutchcoskie et al. |
| 11,433,353 B2 | 9/2022 | Hitchcock et al. |
| 2006/0065520 A1 | 3/2006 | Ballantine et al. |
| 2010/0178237 A1 | 7/2010 | Bonnettt et al. |
| 2011/0084237 A1 | 4/2011 | Wachsman et al. |
| 2011/0297894 A1 | 12/2011 | Brinkman |
| 2012/0122014 A1 | 5/2012 | Brinkman |
| 2014/0260195 A1 | 9/2014 | McAlister |
| 2015/0314232 A1 | 11/2015 | Chen et al. |
| 2016/0053387 A1 | 2/2016 | Kutchcoskie et al. |
| 2017/0263966 A1 | 9/2017 | Lozada et al. |
| 2018/0056240 A1 | 3/2018 | Xin et al. |
| 2018/0071678 A1 | 3/2018 | Ludlow et al. |
| 2018/0209051 A1 | 7/2018 | Baker et al. |
| 2018/0257933 A1 | 9/2018 | Ludlow et al. |
| 2019/0193026 A1 | 6/2019 | Kaneko et al. |
| 2020/0123668 A1 | 4/2020 | He et al. |
| 2020/0230553 A1 | 7/2020 | Xiao et al. |
| 2020/0384411 A1 | 12/2020 | Hitchcock et al. |
| 2023/0017076 A1* | 1/2023 | Hitchcock .......... B01D 69/1216 |
| 2023/0415071 A1* | 12/2023 | Xiao ...................... B01J 20/283 |

FOREIGN PATENT DOCUMENTS

| | | |
|---|---|---|
| DE | 2950911 | 9/1980 |
| EP | 0 364 628 A1 | 4/1990 |
| EP | 1435630 | 4/2006 |
| JP | 2003071251 A | 3/2003 |
| JP | 2014222077 A | 11/2014 |
| RU | 2234973 C2 | 8/2004 |
| WO | WO 2007/000027 A1 | 1/2007 |
| WO | WO 2015/048666 | 4/2015 |
| WO | WO 2015/091781 | 6/2015 |
| WO | WO 2016/034745 A2 | 3/2016 |
| WO | WO 2017/017433 | 2/2017 |

OTHER PUBLICATIONS

U.S. Appl. No. 17/848,878, filed Jun. 24, 2022, Xiao, et al., Low Temperature Decontamination of Tritiated Water.

Bayer, et al. "Tunable Mixed Ionic/Electronic Conductivity and Permittivity of Graphene Oxide Paper for Electrochemical Energy Conversion" *Appl Mater Interfaces* 8(18) (2016) pp. 11466-11475.

Bukola, et al. "Selective proton/deuteron transport through Nafion |graphene| Nafion sandwich structures at very high current density" *J Am Chem Soc* 140(5) (2018) pp. 1743-1752. (Abstract only).

Cao, et al. "Reemission of Tritium from Tritium-Sorbed Molecular Sieve" *Fusion Sci. Technol.* 48 (2005) pp. 593-596. (Abstract only).

Chen, et al. "Progress and Challenges in Transfer of Large-Area Graphene Films" *Advanced Science* 3(8):1500343 (2016) pp. 1-15.

Clark, et al., "Anomalous low-temperature proton conductivity enhancement in a novel protonic nanocomposite", Phys. Chem. Chem. Phys., vol. 16, 2014, pp. 5076-5080.

Drahushuk, L.W. "Transport of Molecules through and on Carbon Nanostructures" *Mass Inst Tech* (2017) pp. 1-116.

Enotiadis, et al. "Graphene-Based Nafion Nanocomposite Membranes: Enhanced Proton Transport and Water Retention by Novel Organo-functionalized Graphene Oxide Nanosheets" *Small* 8(21) (2012) pp. 3338-3349.

Fulbright, et al. "Status and Practicality of Detritiation and Tritium Production Strategies for Environmental Remediation" *U. South Carolina, et al.* WSRC-RP-96-0075 (1996) pp. 1-293.

Gao, et al., "Insights into the Proton Transport Mechanism in $TiO_2$ Simple Oxides by In Situ Raman Spectroscopy", ACS Appl. Matter, Interfaces, vol. 12, 2020, pp. 38012-38018.

Gao, et al., Low-Temperature Protonic Ceramic Fuel Cells through Interfacial; Engineering of Nanocrystalline $BaCe_{0.7}Zr_{0.1}Y_{0.1}Yb_{0.1}O_{3-\delta}$ Electrolytes, Adv. Energy Sustainability Res., vol. 2, 2021, 7 pages.

Geniesse, et al. "2009 Evaluation of Tritium Removal and Mitigation Technologies for Wastewater Treatment" *US Dept. Energy* DOE/RL-2009-18 (2009) pp. 1-51.

Heung, et al. "Tritium Stripping by a Catalytic Exchange Stripper" *Fusion Sci. Technol.* 21 (1992) pp. 588-593.

Hu, et al. "Proton transport through one-atom-thick crystals" *Nature* 516 (2014) pp. 227-230.

Iwai, et al. "Isotopic Distribution Coefficient of Tritiated Water Adsorbed on Faujasite—Type Zeolite" *Fusion Sci. Technol.* 56 (2009) pp. 158-162. (Abstract only).

King, et al. "Concepts for Detritiation of Waste Liquids" *Savannah River Co., et al.* WSRC-MS-91-027 (1991) pp. 1-22.

LDRD. "2016 Annual Report" *Savan. River Nat'l. Lab.* (2016) pp. 1-5.

Li et al., "Improvement of sinterability of $BaZr_{0.8}Y_{0.2}O_{3-\delta}$ for $H_2$ separation using $Li_2O/ZnO$ dual-sintering aid", Ceramics International, vol. 44, 2018, pp. 15935-15943.

Li, et al. "Engineered Transport in Microporous Materials and Membranes for Clean Energy Technologies" *Adv Mater* 30(8):1704953 (2018) pp. 1-33.

Lin, K.H. "Tritium Enrichment by Isotope Separation Technique" *Oak Ridge Nat'l Lab.* ORNL-TM-3976 (1972).

Lozada-Hidalgo, et al. "Sieving hydrogen isotopes through two-dimensional crystals" *Science* 351 (2016) pp. 68-70.

Lozada-Hidalgo, et al. "Scalable and efficient separation of hydrogen isotopes using graphene-based electrochemical pumping" *Nature Communications* 6:15215 (2017) pp. 1-5.

Meng et al., "Insights into Interfacial Proton Transport in Protomic Ceramic Conductors", The Electrochemical Society, ECS Meeting Abstracts, vol. MA2021-01, May 2021, 2 pages.

Meng, et al. "Review: recent progress in low-temperature proton-conducting ceramics" *J Mater Sci* (2019) pp. 1-22.

Nishikawa, et al. "Comparison of Precious Metal Catalysts with Hydrophilic Porous Substrate for Tritium Cleanup System" *J. Nucl. Sci. Technol.* 26 (1989) pp. 261-269.

(56) References Cited

OTHER PUBLICATIONS

Rae, H.K. "Ch. 1—Selecting Heavy Water Processes" *Separ. Hydrog. Isotope* (1978) pp. 1-26.

Sevigny, et al. "Separation of Tritiated Water Using Graphene Oxide Membrane" *Pacific Northwest National Laboratory* PNNL-24411 (2015) pp. 1-39.

Soda et al., "Isotope Effects in Diffusions of H and D in Hydrogen Isotope Exchange in Oxide Ceramics", Journal of Nuclear Science and Technology, vol. 39, No. 4, Apr. 2002, pp. 359-362.

Tanaka, et al. "Removal of Tritiated Water Vapor by Adsorption on Molecular Sieves—Effects and Development of Co-Existing $H_2O$" *Fusion Sci. Technol.* 8 (1985) pp. 2196-2201. (Abstract only).

Wang et al., "Synthesis of $BaCe_{0.7}Zr_{0.1}Y_{0.1}O_{3-\delta}$ proton conducting ceramic by a modified Pechini method". Solid State Ionics, vol. 213, 2012, pp. 29-35.

Wang et al . . . "Two-Step Reactive Aid Sintering of $BaZr_{0.8}Y_{0.2}O_{3-\delta}$ Proton-Conducting Ceramics", Journal of Electronic Materials, vol. 44, No. 12, 2015, 9 pages.

Xiao, et al. "Development of Liquid Phase Water Detritiation Technology" *Savannah River Nucl. Sol.* (2016) pp. 22-25.

Yan, et al. "A monolayer graphene—Nafion sandwich membrane for direct methanol fuel cells" *J Power Sources* 311 (2016) pp. 188-194.

Zhao, et al., "Moderate temperature sintering of $BaZr_{0.8}Y_{0.2}O_{3-\delta}$ protonic ceramics by A novel cold sintering pretreatment", Ceramics International, vol. 47, 2021, pp. 11313-11319.

Zhou, et al. "Equipment design for thermal cycling absorption process col. efficiency test" *Int'l J. Hydrog. Energ.* 39 (2014) pp. 13880-13885.

Related U.S. Appl. No. 17/877,167 and U.S. Appl. No. 17/848,878.

\* cited by examiner

NANOSTRUCTURED CERAMIC MEMBRANES FOR HYDROGEN ISOTOPE SEPARATION

STATEMENT AS TO RIGHTS TO INVENTIONS MADE UNDER FEDERALLY SPONSORED RESEARCH

This invention was made with Government support under Contract No. 893033210EM000080, awarded by the United States Department of Energy. The Government has certain rights in the invention.

BACKGROUND

Tritium is a low energy beta emitter with a half-life of about 12.3 years. While tritium is not dangerous externally, it is a radiation hazard upon inhalation, ingestion, or absorption. Tritium can be produced in nuclear power generation as a byproduct of the fission of uranium-235, plutonium-239, and uranium-233, as well as by neutron activation of lithium-6. In heavy water-moderated and -cooled reactors, tritium can be produced when a deuterium nucleus captures a neutron.

The tritium present in used nuclear fuel is handled in reprocessing scenarios by either a pretreatment step before fuel dissolution, which concentrates tritium in a low-volume gas stream or, as tritium readily binds hydroxyl radicals to form tritiated water (HTO), by direct dissolution of used fuel resulting in a high-volume aqueous stream with low tritium concentrations (about $1\times10^{-5}$ or 10's of ppm). Though relatively small amounts of tritium are present, tritiated water can build up over time within cooling water and water used in storage pools at nuclear power generating facilities. Approaches to address this challenge have focused on zeolite-based absorbents operating as pervaporation membranes and graphene-based membranes for tritiated water separation.

Proton conducting ceramics (PCC) have been examined for use in the nuclear industry for electrolysis and separations. Proton ceramic electrolysis cells have been investigated as a method of processing HTO in the International Thermonuclear Experimental Reactor fusion reactor system. Prior work has demonstrated significant advantages of ceramics in the nuclear industry due to the enhanced radiation stability and the ability to perform electrolysis at elevated temperatures in the vapor phase, which avoids the potential exposure and associated risk of liquid HTO. Most of the known PCCs such as $(Ba,Sr)CeO_3$ and $BaZr_{0.8}Y_{0.2}O_{2.9}$ rely on proton transport within the crystalline lattice. However, a number of recent studies have reported proton conductivity at low temperatures in zirconia, ceria, and titania based systems. This proton conductivity has been attributed to absorbed water at the grain boundary interfaces in these systems. This effect vanishes at temperatures greater than 500° C., where dehydration of the interfaces occurs, and the conductivity reverts to that of the bulk material.

What are needed in the art are materials and methods for tritium decontamination. Methods that incorporate radiation stable materials such as PCCs would be of benefit in the art.

SUMMARY

In one embodiment, disclosed are methods for removal and recovery of a heavy hydrogen isotope (deuterium and/or tritium) from an aqueous stream. Methods can include contacting a hydrated separation phase with an aqueous stream at a temperature of about 100° C. or lower, the aqueous stream comprising a heavy hydrogen isotope. The hydrated separation phase includes a PCC having an average grain size of about 500 nm or less. Upon the contact, the heavy hydrogen isotope of the low temperature aqueous stream is preferentially exchanged with a lighter hydrogen isotope of the hydrated separation phase, thereby purifying the aqueous stream. A method can also include subsequently contacting the separation phase that now carries the adsorbed heavy hydrogen isotope with an aqueous stream at a temperature of about 100° C. or higher, e.g., superheated steam. Upon this contact, the heavy hydrogen isotope of the hydrated separation phase is preferentially exchanged with a lighter hydrogen isotope of the high temperature aqueous stream. Thus, the separation phase can be regenerated for further use.

According to one embodiment, a system is disclosed for removal and recovery of heavy hydrogen isotopes from an aqueous stream. The system can include a column that can contain a hydrated separation phase within the interior of the column. The hydrated separation phase includes a PCC having an average grain size of about 500 nm or less. A column can include an inlet for a low temperature aqueous stream and an outlet for the purified aqueous stream. The column can also include an inlet and an outlet for a high temperature aqueous stream used to regenerate the column. A system can also include a condenser for condensing a high temperature steam flow off of the column and forming a liquid with a high content of the heavy hydrogen isotope. In some embodiments, a system can include multiple columns such that one column can be separation heavy hydrogen isotope(s) from a contaminated aqueous stream while another column is being regenerated.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
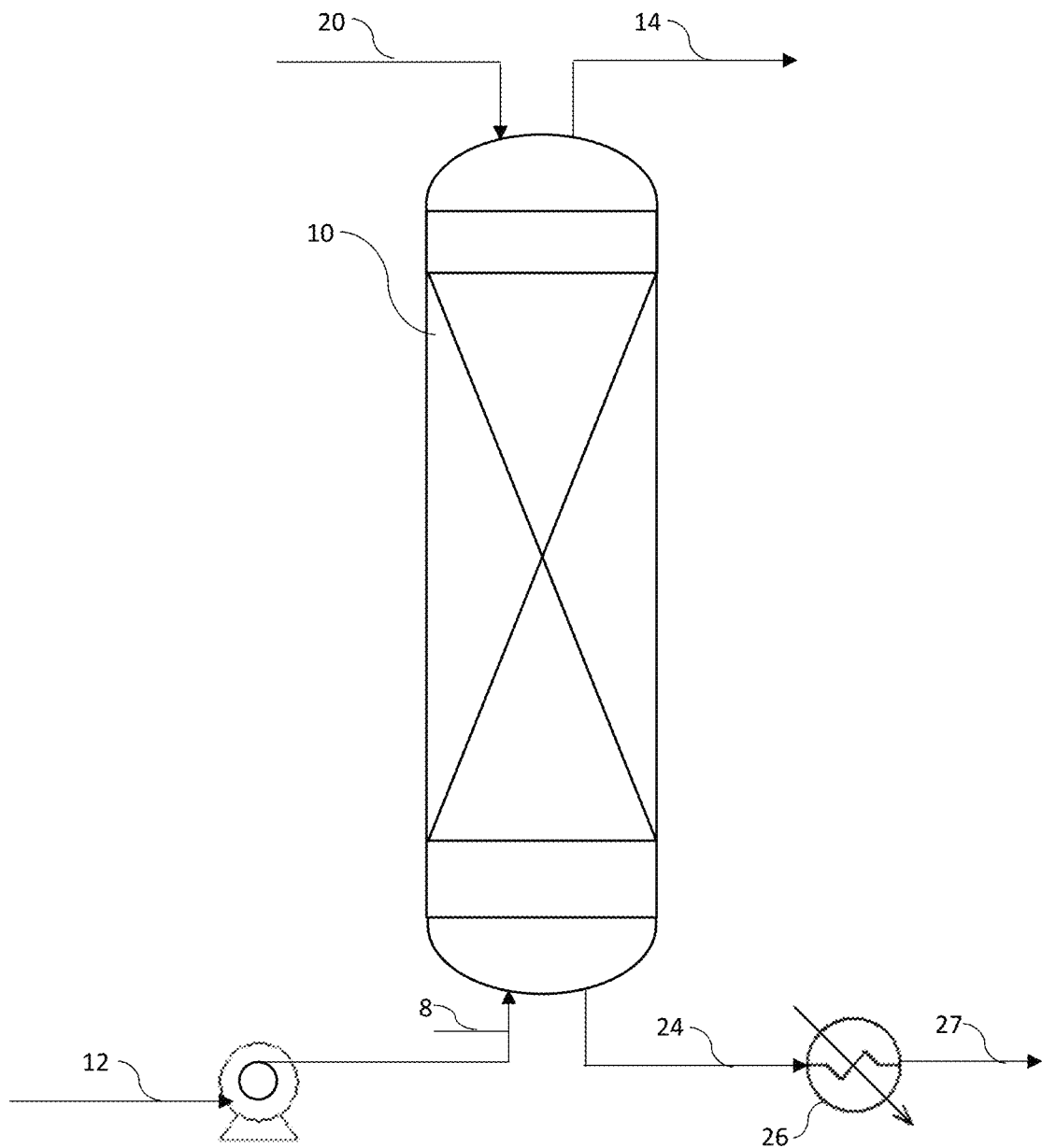
FIG. 1 schematically illustrates a separation system as disclosed herein.

It is to be understood by one of ordinary skill in the art that the present discussion is a description of exemplary embodiments only and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are methods and systems for separating and concentrating a heavy hydrogen isotope (deuterium and/or tritium) from an aqueous stream. In one particular embodiment, methods and systems are designed for separation and concentration of tritium from an aqueous stream. The separation method can include a first separation stage during which a heavy hydrogen isotope carried in a relatively low temperature aqueous stream (e.g., in the form of HDO, HTO, etc.) is exchanged with a lighter hydrogen isotope as the liquid stream is passed across a hydrated separation phase, thereby purifying the aqueous stream. The method can include a second regeneration stage during which the heavier hydrogen isotope now in the separation phase is exchanged with a lighter hydrogen isotope (protium and/or deuterium) carried in a higher temperature aqueous stream that is passed across the separation phase to regenerate the separation phase. This latter regeneration exchange provides a product stream that carries the heavy hydrogen isotope(s) in a relatively high concentration.

The separation phase of the methods and systems includes a PCC having a very small grain size, on the nanometer scale. Without wishing to be bound to any particular theory, it is understood that the small grain size of the separation phase provides enhanced disorder and elevated surface energy at the nanoscale grains making dissociated water adsorption more favorable. The interfacial hydrated layer may include hydroxyl species bound to the ceramic surface and surface hydroxyl layers with varying degree of bonding strength. The small-grained PCC materials can exhibit excellent isotope exchange characteristics, favoring heavy hydrogen isotope exchange with protium of the hydrated materials at low temperatures and the opposite effect at high temperatures. For instance, strongly bound surface hydroxyl groups (OH) of a hydrated PCC phase can exhibit full hydrogen/deuterium (H/D) exchange at 400° C. within about 120 minutes. At temperatures near 50° C., on the other hand, weakly bound free water molecules at the interface can complete H/D isotope exchange within about 10 minutes.

In one embodiment, the separation phase can include a doped perovskite type PCC of the general composition

$A_{1-x-\alpha}P_xB_{1-y}Q_yO_{3-\delta}$ in which A is a bivalent cation such as Ba, Sr, Ca or Mg and combinations thereof, P is an A-site dopant, which may be a cation such as Pr, Sm, Er or other cations belonging to the lanthanide series, B is a tetravalent cation which may be either an element in Group IV of the periodic table (e.g., Ti, Zr) or an element in the lanthanide series of the periodic table (e.g., Ce, La) or a combination thereof. Q is a B-site dopant which may be either an element in Group III of the period table (e.g., Sc, Y) or another element (other than B) in the lanthanide series of the periodic table (e.g., Eu, Nd, Gd, Yb) or a combination thereof. α represents the A-site non-stoichiometry (deficiency), and δ represents an oxygen deficiency. In one embodiment, α can be from about 0 to about 0.1 and δ can be from about 0 to about 0.3, Some embodiments can include compounds with specific combination of elements on the A and B sites represented by the chemical formulas $Ba_{1-x-\epsilon}P_xCe_{1-y}Q_yO_{3-\delta}$, $Sr_{1-x-\epsilon}P_xCe_{1-y}Q_yO_{3-\delta}$, and $Ca_{1-x-\epsilon}P_xTi_{1-y}Q_yO_{3-\delta}$. Other embodiments can include an A-site deficiency ε, where $0 \leq \alpha \leq 0.1$ and where $0 \leq \epsilon \leq 0.3$, It should be understood that P and Q may represent more than one element of the type specified above, and addition of more than one dopant at the A and B site fall within the scope of this disclosure.

In one embodiment, a separation phase can include a complex perovskite. For example, a complex perovskite can be of the types $A_2(B'_{1+\beta}B''_{1-\beta})O_{6-\lambda}$ or $A_3(B'_{1+\varphi}B''_{2-\varphi})O_{9-\lambda}$, in which A ions are always bivalent as described above, B' ions are trivalent (e.g., Y, Ga, Sc, In, Yb, Nd) or tetravalent (e.g., Zr, Ti, Ce), and B" ions are pentavalent (e.g., Bi, Nb). Generally, $0 \leq \beta \leq 0.2$ and $0 \leq \varphi \leq 0.2$. λ may range from about 0 to about 0.2.

Examples of perovskite-type PCC as may be utilized in a separation phase can include, without limitation, $BaZrO_3$, $BaZr_{0.25}In_{0.75}O_{3-\delta}$, $BaZr_{0.9}Y_{0.1}O_3$, $BaZr_{0.85}Y_{0.15}O_3$, $Ba_{0.97}Zr_{0.77}Y_{0.19}Zn_{0.04}O_3$, $BaZr_{0.8}Y_{0.2}O_3$, $BaZr_{0.5}In_{0.5}O_{3-\delta}$, $BaCeO_3$; $BaZr_{0.1}Ce_{0.7}Y_{0.2}O_{3-d}$, $BaCe_{0.9}Gd_{0.1}O_3$, $BaCe_{0.8}Zr_{0.1}Gd_{0.1}O_3$, $BaCe_{0.45}Zr_{0.45}Sc_{0.1}O_3$, $BaCe_{0.7}Zr_{0.1}Y_{0.1}Yb_{0.1}O_{3-\delta}$, $BaCe_{0.65}Zr_{0.20}Y_{0.15}O_{3-\delta}$, $BaCe_{0.9}Y_{0.1}O_{2.95}$, $BaCe_{0.8}Y_{0.2-x}Nd_xO_{3-\delta}$ (x=0-0.15); $Ba_{0.5}Sr_{0.5}Ce_{0.6}Zr_{0.2}Gd_{0.1}Y_{0.1}O_{3-\delta}$, $BaSn_{0.5}In_{0.5}O_{2.75}$, $Ba_{0.9}La_{0.1}Sn_{0.5}In_{0.5}O_{2.8}$, $Ba_{0.9}Gd_{0.1}Sn_{0.5}In_{0.5}O_{2.8}$, $SrCeO_3$, $SrCe_{0.95}Yb_{0.05}O_3$, $Sr_3CaZr_{0.5}Ta_{1.5}O_{8.75}$, $CaZrO_3$, $SrZrO_3$, $BaTiO_3Ce_{0.9}Gd_{0.1}O_{2-\delta}$, etc.

In one embodiment, a separation phase can include a pyrochlore structure $(A_{2-\gamma}A''_\gamma)_2(B_{2-\eta}R_\eta)O_{7-\lambda}$ where A is a bivalent cation, A" is another bivalent cation, B is a tetravalent cation as described above, and R is a bivalent cation (e.g., Ca). In one embodiment, A" and R can be the same cation, Generally, $0 \leq \gamma \leq 0.3$ and $0 \leq \eta \leq 0.3$.

Other examples of PCC as may be incorporated in a separation phase can include, without limitation, fluorite-type materials such as yttria stabilized zirconia (YSZ); metal oxide hydrates like $ZrO_2 \cdot nH_2O$, $Sb_2O_5 \cdot nH_2O$ and $WO_3 \cdot 2H_2O$; simple oxides such as $TiO_2$, $ZrO_2$, $CeO_2$; and phosphate type materials such as $Sn_{0.9}In_{0.1}P_2O_7$, $CsH_2PO_4/SiP_2O_7$ composites, $SnP_2O_7$—$SnO_2$ composites, as well as combinations thereof.

The PCC of the separation phase has a small grain size. For instance, the PCC can have a grain size of about 500 nm or less, about 400 nm or less, about 300 nm or less, or about 200 nm or less, such as from about 50 nm to about 300 nm, from about 75 nm to about 250 nm, or from about 100 nm to about 200 nm in some embodiments. The grain size of the separation phase can be determined by SEM visual grain size examination and image analysis to determine statistics on grain size and standard deviation.

While the formation method to provide the PCC is not particularly limited, it should be one that can form the separation phase with the grain size and relative density as described. A number of methods have been developed to facilitate the cost-effective preparation of nanostructured membranes for practical applications including, without limitation, conventional sintering, two-step sintering, solid-state reactive sintering, and spark plasma sintering.

In one embodiment, the PCC separation phase can be formed according to a cold sintering process. Most sintering processes occur at high temperatures (e.g., greater than about 1000° C.). Cold sintering process (CSP) is an extremely low-temperature sintering process (room temperature to about 200° C.) that uses aqueous based solutions as transient solvents to aid densification. In conventional high-temperature sintering processes, individual ceramic powder particles densify into a dense object. The driving force for this process is the reduction of the high surface free energy of the powder by material diffusion which only occur at high temperatures. Cold sintering instead relies on interfacial solution effects in water for the densification of the materials and is a process that occurs at low temperatures and over much shorter time when pressure is applied.

In one embodiment, a separation phase can be formed according to a two-stage cold sintering process that includes an initial stage that can be predominated by mechanical forces and particle rearrangement, and a second stage that can be predominated by pressure/temperature-assisted dissolution and precipitation events that are driven by local and global gradients within a pellet die.

A two-stage cold sintering formation process can include a first stage in which powders of the desired PCC material can be combined with a binder for formation of a green form separation phase. The binder can include any typical binder as is known in the art, e.g., polyvinyl alcohol (PVA), polyethylene, polypropylene, etc., or any combination thereof. The binder can be dissolved in a suitable solvent (e.g., water) as is known. In some embodiments, the binder can include additional water beyond that necessary for dissolution. For instance, the PCC powder/binder mixture can include up to about 30 wt. % water, e.g., from 0 to about 30% water, from about 5 wt. % to about 25 wt. % or from about 10 wt. % to about 20 wt. % binder, in some embodiments.

The PCC/binder mixture can be located in a die of any desired shape and pressed under high pressure for a period of time. For instance, the mixture can be pressed at pressure of about 200 MPa or greater, such as about 300 MPa or greater, or about 400 MPa in some embodiments.

The pressing can be carried out at room temperature for a period of time (e.g., up to about 30 minutes), followed by a temperature ramp-up to a cold sintering temperature while maintaining the high pressure conditions. In other embodiments, a high pressure period at room temperature is not required prior to ramp-up to the cold sintering temperature, and the high pressure period can be initiated with ramp-up to the cold sintering temperature.

Cold sintering can be carried out at a temperature of about 300° C. or less, such as about 200° C. or less, such as from about 100° C. to about 200° C., in some embodiments, while holding the green form at high pressure. In general, cold sintering can be carried out for a period of time of about 30 minutes or more, e.g., from about 1 hour to about 2 hours, in some embodiments.

Following the cold sintering, the green form can be finally sintered. If desired, a low temperature heating of the green form can be carried out to ensure complete removal of any remaining water prior to the final sinter. Traditionally, PCP are sintered at extremely high temperatures of about 1700° C. or greater. In forming disclosed separation phase materials, the final sintering temperatures can be considerably less than traditional high sintering temperatures, such as about 1600° C. or less, such as about 1550° C. or less, such as from about 1250° C. to about 1550° C. or about 1300° C. to about 1500° C., in some embodiments.

In some embodiments, the sintered PCC product can exhibit a high relative density. For instance, when formed as sintered pellets, each pellet can exhibit a bulk density of about 80% or greater, about 85% or greater, or about 90% or greater, e.g., 100%, in some embodiments. Bulk density can be determined by, e.g., geometrical density or Archimedes density. However, the form of the product is not limited to sintered pellets, and the PCP can be in any suitable form, e.g., pellets of any suitable size and shape that can be used to form a packed bed through which a fluid can pass, membranes through or over which a fluid can pass during use, or any other form that can provide for intimate contact between the hydrated PCC product and an aqueous flow for exchange of hydrogen isotopes.

Irrespective of the formation method used to form the separation phase and the final form of the separation phase, the PCC separation phase including the small grain size can exhibit an isotope separation factor for heavy hydrogen isotopes that varies with temperature so as to provide an isotope exchange system that can be completely reversible with temperature control. In particular, the separation phase can exhibit an isotopic separation factor at low temperatures (about 100° C. or less) that favors heavier hydrogen isotopes. For instance, the separation phase can exhibit a separation factor at temperatures less than 100° C. of about 0.9 or lower, such as about 0.8 or lower, about 0.7 or lower, about 0.5 or lower, or about 0.3 or lower, such as about 0.25, in some embodiments. At high temperatures (about 100° C. or greater), the separation phase will favor the lighter isotope. For instance, the separation phase can exhibit an isotopic separation factor at temperatures higher than 100° C. of about 1.1, such as about 1.2, or even higher, in some embodiments.

As utilized herein the term 'isotopic separation factor $\alpha$, is defined as $$\alpha=[C'/(1-C')]/[C''/(1-C'')],$$

in which C' and (1−C') are the relative concentrations of $H_2O$ and H(D/T)O, respectively, in a stream at the inlet of a finite separation stage including contact between a separation phase and the stream, and C'' and (1−C'') are the corresponding quantities in the stream at the outlet of the finite separation stage.

Beneficially, disclosed separation phase materials can exhibit desirable temperature-controlled hydrogen isotope selectivity without the need for isotope exchange catalysts, as have been required for previously known separation materials. While catalyst materials can be used in some embodiments, in one embodiment, a separation phase can be free of hydrogen isotope separation catalysts as have been standard in the art (e.g., Groups 8, 9, 10, transition metals including Fe, Co, Ni, Ru, Rh, Pd, Os, Ir, Pt).

In use, a separation phase can be provided in a high surface area format to encourage contact between the separation phase and a fluid stream. For instance, the separation phase in the form of sintered pellets can be provided in a high surface area packed bed format, e.g., a plurality of small particles through which a stream can be fed. In other embodiments, a separation phase can be provided in a high surface area membrane format, e.g., a porous membrane through which and/or across which a fluid stream can be fed. Individual particles of a bed can be relatively small, e.g., on the micrometer or millimeter scale, such as about 1 mm or less in cross-section, or about 500 µm or less in some embodiments. A separation phase membrane can be relatively thin, e.g., about 500 µm or less in thickness, e.g., about 200 µm or less, about 100 µm or less, or about 50 µm or less, in some embodiments. In one embodiment, a high surface area separation phase can have a surface area of about 100 square meters per gram ($m^2/g$) or greater, about 200 $m^2/g$ or greater, or about 300 $m^2/g$ or greater.

Beneficially, disclosed systems are easily scalable for either high volume or low volume throughput, and as such, systems can be designed for any size facility. Moreover, the throughput of an existing system can be modified through relatively simple addition or removal of columns to a previously existing system providing a modular approach for facility design and update.

FIG. 1 presents one embodiment of a column 10. The separation phase can be retained within the column so as to contact the aqueous phase as it passes through the column, e.g., a packed bed, a series of membranes, etc. During a first separation stage, an aqueous stream 12 including a relatively high concentration of a heavy hydrogen isotope, e.g., tritiated water (HTO), can fed (e.g., pumped) to the column 10. For instance, the system can include a liquid inlet for feeding the aqueous stream 12 into the column 10. While illustrated with the aqueous stream 12 feeding into the column 10 at the bottom of the column 10, it should be understood that the flow through the column during a purification stage can alternatively be in the opposite direction, i.e., from the top of the column to the bottom of the column.

The aqueous stream 12 can include contaminated water in either a liquid or vapor form or a combination thereof at a temperature at which the separation phase retained within the column 10 will favor exchange of lighter isotope(s) for the heavy isotope(s), e.g., 100° C. or less. As such, in some embodiments, the inlet stream can be fed to the column 10 in a liquid form. For instance, a column 10 can operate during a separation stage at a temperature of about 25° C., and a liquid aqueous stream 12 can be fed to the column 10.

In one embodiment, the aqueous stream 12 can be fed to a column 10 in conjunction with a carrier gas. For instance, the contaminated water can be injected into the column in conjunction with a carrier gas, e.g., nitrogen, helium, argon, air, etc. Upon combination with the carrier gas, the liquid feed of the contaminated water can be vaporized at least somewhat, and the flow rate of the carrier gas can be varied so as to ensure that the combined streams can include the contaminated water at or near the saturation partial pressure of water (e.g., within about 10%) at the operating conditions of the column 10 during the separation stage.

In one embodiment, the aqueous stream 12 can be formed by bubbling a carrier gas through a liquid source of the contaminated water and thereby form an aqueous stream in which the contaminated water is wholly in the form of a vapor with the carrier gas. The flow rate of a carrier gas through a liquid source can be varied, for instance, from about 200 sccm to about 800 sccm in some embodiments, but can generally be such that the aqueous stream 12 is at or near saturation of the vapor at the operating conditions of the column 10, e.g., within about 10% of the saturation partial pressure of water at the operating conditions of the column 10 during the separation stage. For instance, at a column 10 operating temperature of about 25° C. during a separation stage, an aqueous stream 12 can include the contaminated water vapor at a partial pressure of about 20 Torr (about 2.5 kPa).

In embodiments, the contaminated water can be pretreated prior to formation of an aqueous stream 12. For instance, in those embodiments in which the contaminated water originates from an open environmental source, such as seawater, the contaminated water from the source can be deionized prior to proceeding with a separation process.

A column 10 can be sized to process any desired volume of contaminated water, for instance, a high volume of about 500 tons per day or greater, about 800 tons per day or greater, or about 1000 tons per day or greater, in one embodiment. Accordingly, the column can be designed to accommodate the desired capacity. For example, the column can have an inside diameter of about 5 feet or greater, or about 6 feet or greater, and can have a height of about 50 feet or greater, about 60 feet or greater, or about 70 feet or greater, in one embodiment. Of course, the dimensions of the column 10 are not critical to the system and can be varied to accommodate any particular system and the dimensional design of a column would be well within the abilities of one of skill in the art.

The system and method can effectively treat high volumes of contaminated water having a low concentration of heavy hydrogen isotope contaminant. For instance, the contaminated water can include tritium at a concentration on the order of parts per billion or parts per trillion. By way of example, the system can treat a contaminated water stream including a tritium contaminant at a concentration of about 1 part per billion (ppb) or less, about 500 parts per trillion (ppt) or less, or about 100 ppt or less. In one embodiment, the contaminated water can include tritium in a concentration of about 20 ppt or less.

To encourage the desired isotope exchange, the separation phase retained within the column 10 can be hydrated and can include water molecules that can be exchanged with tritiated water molecules during the separation stage of a process. According to one embodiment, the separation phase can also include ions that can preferably have associated therewith water molecules of hydration. For instance, the separation phase can include a cationic material that can associate with one or more water molecules. A cationic material can include, without limitation, ammonium cations or certain metal cations such as Al, Mg, Cu, Zn, Cr, or combinations thereof.

In general, the separation phase retained within the column 10 can be loaded with water prior to contact between a contaminated aqueous stream and the separation phase. For instance, a wet column can be prepared by injecting clean water into a column 10, for instance, via a water inlet 8, prior to feeding the contaminated aqueous stream 12 to the column 10. In general, a column 10 can be considered to be a wet column when an interior volume of the column 10 that contains the separation phase is at or near full water saturation at the operating conditions of the separation stage, e.g., in which the water partial pressure within the column 10 at operating conditions at initiation of a separation stage is such that the interior volume is about 90% of full water saturation or greater.

In some embodiments, a wet column 10 can be provided at a separation stage through control of conditions during a previous regeneration step. For instance, a regeneration step can be carried out using steam at a relatively high temperature, and upon cooling of the column 10, liquid water can remain within regenerated separation phase of the column 10. The more hydroxyl groups that remain on the separation phase following a regeneration stage, the wetter, and the column can be fully wetted at initiation of a separation stage.

If necessary, prior to feeding the contaminated aqueous stream 12 to a column 10, the contents (in particular, the separation phase) of the column 10 can be cooled. For instance, the contents of a column 10 can be cooled to a temperature of about 80° C. or less, about 50° C. or less about 40° C. or less, or about 30° C. or less, in some embodiments (while remaining above freezing point of water). The method used to cool the column 10 is not particularly limited. For instance, following a regeneration of the column 10 by use of a high temperature aqueous stream 20, a cool stream of un-contaminated water can be pumped through the column via inlet 8 to decrease the interior temperature of the column 10 to a desired temperature prior to feeding a contaminated aqueous stream 12 into the column 10 during a separation stage.

During the separation stage of a process, deuterium and/or tritium of the input stream 12 can be exchanged with protium (and/or deuterium) of the separation phase and purified decontaminated water can exit the top of the column 10 at 14. For instance, the purified water stream that exits the top of the column 10 can be modified from a radioactivity level of input tritiated water of about 10,000 Bq/mL or more, about 30,000 Becquerel per milliliter or more, or about 60,000 (Bq/mL) or more to purified detritiated water having a radioactivity level of about 1000 Bq/mL or less, about 100 Bq/mL or less, or about 60 Bq/mL or less.

The adsorbed heavy hydrogen isotope of the column 10 can describe a concentration profile as the heavy isotope is adsorbed within the column 10 with a decreasing concentration of the heavy isotope from the inlet to the exit of the column 10 following a separation stage. The separation stage can continue until the column effluent reaches radioactive breakthrough, e.g., radioactivity due to tritium reaches about 60 Bq/mL. Following radioactive breakthrough in the effluent 14, the flow of the aqueous stream 12 through the column 10 can be stopped and a regeneration stage of a process can be carried out.

During a regeneration stage, a hot aqueous flow 20 can be fed via (in this embodiment) an inlet at the top of the column 10 and following exchange with a heavy hydrogen isotope of the separation phase can exit via an outlet 24. Alternatively, the regeneration flow can be fed to the bottom of the column 10 and can exit out of the top of the column 10. In general, however, the regeneration flow 20, 24 can be countercurrent to the separation flow 12, 14.

The regeneration flow can include a lighter hydrogen isotope than that adsorbed to the separation phase during a separation stage. For instance, in a tritium purification process, the regeneration flow 20 can include protium, deuterium, or a mixture thereof. The regeneration flow can be an aqueous flow at a higher temperature to encourage ion exchange of lighter isotope(s) of the regeneration flow with the heavier hydrogen isotope(s) of the separation phase. For instance, the regeneration flow 20 can include steam, e.g., superheated steam, at a temperature of about 100° C. or greater. For example, during the regeneration stage, protium and/or deuterium of the regeneration flow 20 can exchange with tritium on the column 10 to enrich the regeneration flow at the outlet 24 in tritium and regenerate the separation phase for a follow-on separation stage.

The flow rate of the regeneration flow 20 through the column 10 can vary. For example, in one embodiment, a steam regeneration flow at a flow rate of about 52 liters per minute through the column 10 can pick up about 100 parts per million (ppm) tritium.

Upon the exchange of lighter hydrogen isotope(s) for heavier hydrogen isotope(s) on the separation phase, the separation phase within the regenerated column 10 can again enter a separation stage of the process with initialization of flow of a contaminated aqueous stream 12 through the column 10. Thus, the system can provide a self-regenerating column 10 that does not require isotope separation catalysts, which can decrease down time of a system and provide cost savings and other added benefits.

In those embodiments in which a system is utilized to recover tritium, a tritium-enriched outlet flow 24 can include tritium in a relatively high concentration, for instance, about 5 ppm or greater, about 10 ppm or greater, or about 100 ppm or greater. The outlet flow 24 that is enriched in the heavy hydrogen isotope (e.g., tritium) can exit the column 10 and can be further processed as desired. For instance, as illustrated in FIG. 1, the outlet flow 24 can be passed through a condenser 26 providing a liquid product 27 that includes a high tritium concentration.

Figure 2:
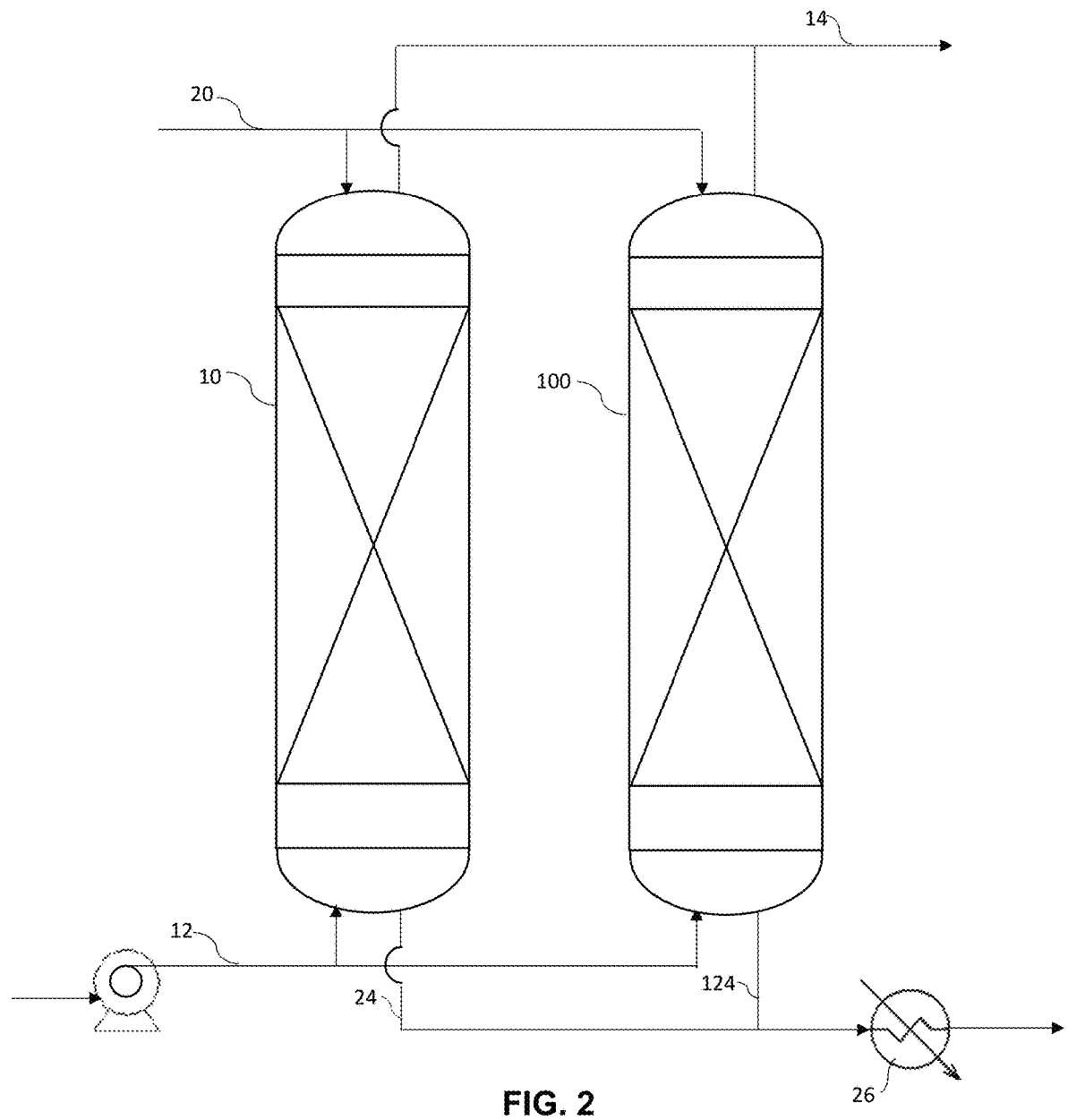
FIG. 2 schematically illustrates a multi-column separation system as disclosed herein.

To further improve efficiency, a system can include multiple columns that can operate simultaneously. For instance, and as illustrated in FIG. 2, in one embodiment, a system can include two columns 10, 100 that can operate parallel to one another and in opposite stages to one another. For instance, a first column 10 can be operating in the separation stage of a process, and a second column 100 can be simultaneously operating in a regeneration stage of a process. In such a fashion, a gaseous flow, either flow 24 or flow 124, that is enriched in a heavy hydrogen isotope can be passing through a condenser 26 to condense the hot regeneration flow and the overall output from the system can be continuous. Meanwhile, an aqueous stream 12 can be fed to the other of the two columns 10, 100 to produce a purified stream 14 successively from each column and continuously from the system. Additional columns can be included to further increase throughput and the rate of purified water from a system.

A system as described herein can separate and recover about 95% or greater, about 97% or greater, or about 99% or greater of the tritium contained in a contaminated aqueous stream. For instance, the purified water obtained in the separation stage of the process can include less than about 60 Bq/mL radioactivity from tritium.

Tritiated water that can be separated and recovered according to one embodiment of disclosed processes can be suitable for any use as is known in the art. For instance as a chemical tracer, e.g., as a radiolabel or as a tracer in circulation and ventilation.

The disclosure may be better understood by reference to the Examples, set out below.

Example 1

Perovskite $BaZr_{0.8}Y_{0.2}O_{3-\delta}$ (BZY20) nano-powders were synthesized by a modified Pechini method previously described. Briefly, Stoichiometric amounts of $Ba(NO_3)_2$ (99+% Alfa Aesar), $ZrO(NO_3)_2$ solution (~35 wt. %, Sigma Aldrich), and $Y(NO_3)_2$ (99.9%, Alfa Aesar) were mixed into the proper amount of deionized water in a beaker. Ethylenediaminetetraacetic acid (EDTA, 99.4%, Alfa Aesar) and citric acid monohydrate (99.5%, ACROS Organics) were added to the nitrate solution with magnetic stirring. The molar ratios of EDTA and citric acid to the total cation were both 1.5:1 and 1:1, respectively. The solids dissolved and formed a clear solution after slowly adding ammonium hydroxide (NH$_3$$^+$H$_2$O, 28-30% w/w, LabChem) to adjust pH around 10. With gradual water vaporization at 80-90° C. on a hot plate, the solution turned into a viscous gel. After further drying at 150° C. for 48 h in a box oven, the gel turned into a dark charcoal-like primary powder, which calcined at 900° C. for 10 h to form crystalized B2Y20 perovskite precursor powder.

The as-synthesized BZY20 powder was mixed with a polyvinyl alcohol (PVA, Alfa Aesar) aqueous solution (3 wt. % PVA in deionized water) to achieve the desired water amount of the total powder weight. Around 0.8 g of wet BZY20 powder was evenly packed in circular carbon-aided steel die set with a diameter of 12.7 mm. The pressing was initially performed under about 400 MPa at room temperature for 10 min. The die set was then heated to 180° C. with a ramp rate of 10° C./min by a heating tape and held for 1 h to perform the cold sintering pretreatment under the same pressure.

The pellet was placed in the box furnace overnight at 120° C. to completely remove residual water. A final sintering process was utilized to get a porous BZY20 pellet.

The influence of water amount, final sintering temperature, and final sintering time were investigated.

Figure 3:
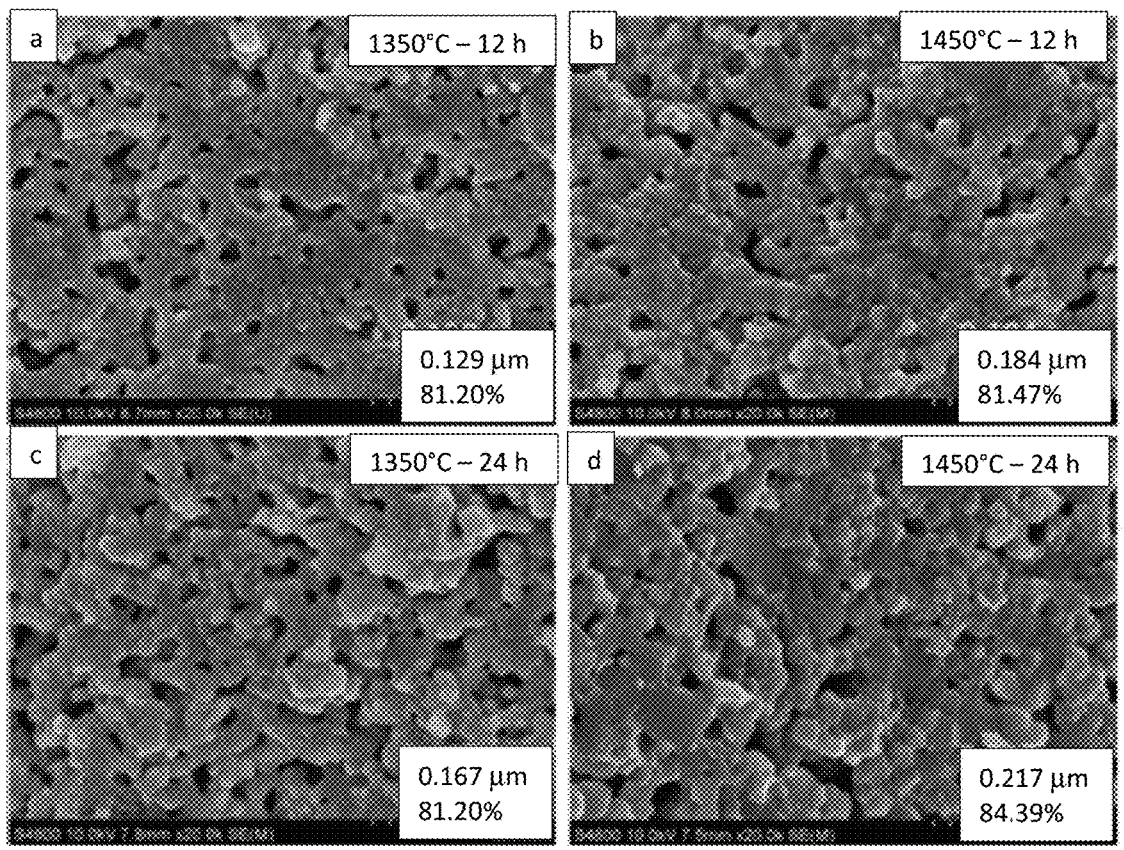
FIG. 3 compares scanning electron microscope (SEM) images of several PCC pellet cross-sections that were sintered at (a) 1350° C. for 12 h; (b) 1450° C. for 12 h; (c) 1350° C. for 24 h; and (d) 1450° C. for 24 h. (Average grain size and relative density calculated by images are shown at bottom right corner for each image.)

Initially, 20 wt. % water was selected as the water amount and pellets were finally sintered at 1350° C. and 1450° C. for 12 h or 24 h, respectively. As seen in FIG. 3, both higher sintering temperature and longer sintering time resulted in larger grain size and higher relative density. Relative densities were calculated based on images, and as such, they are a little higher than those obtained from measurements of geometrical density. From these results, it was concluded that a lower sintering temperature is better for obtaining uniform grain sizes with lower relative density.

Figure 4:
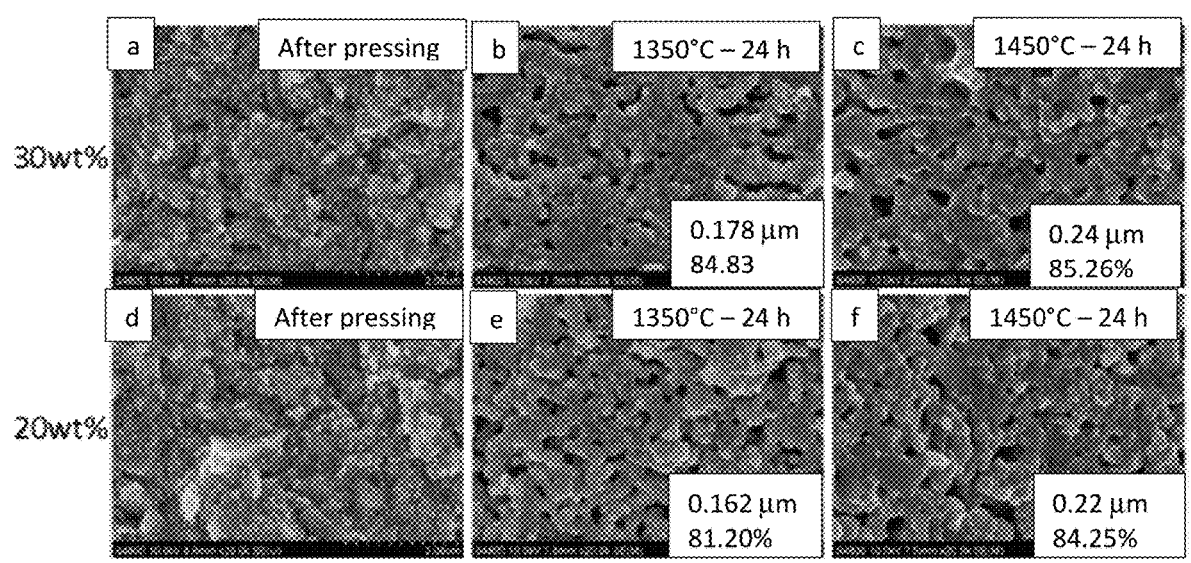
FIG. 4 compares SEM images of several PCC pellet cross-sections formed with different water amounts including (a) 30 wt. % water after pressing; (b) 30 wt. % water sintered at 1350° C. for 24 h; (c) 30 wt. % water sintered at 1450° C. for 24 h; (d) 20 wt. % water after pressing; (e) 20 wt. % water sintered at 1350° C. for 24 h; and (f) 20 wt. % water sintered at 1450° C. for 24 h. (Average grain size and relative density calculated by images are inserted at bottom right corner for each image.)

Different water amounts, 20 wt. % and 30 wt. % of the total powder weight, were used to densify BZY20 nanopowders. As shown in FIG. 4, samples prepared with different water amounts resulted in similar cross-section views. However, after firing, noticeable differences were observed. In brief, higher water concentration resulted in a larger grain size and higher relative density.

Example 2

Figure 5:
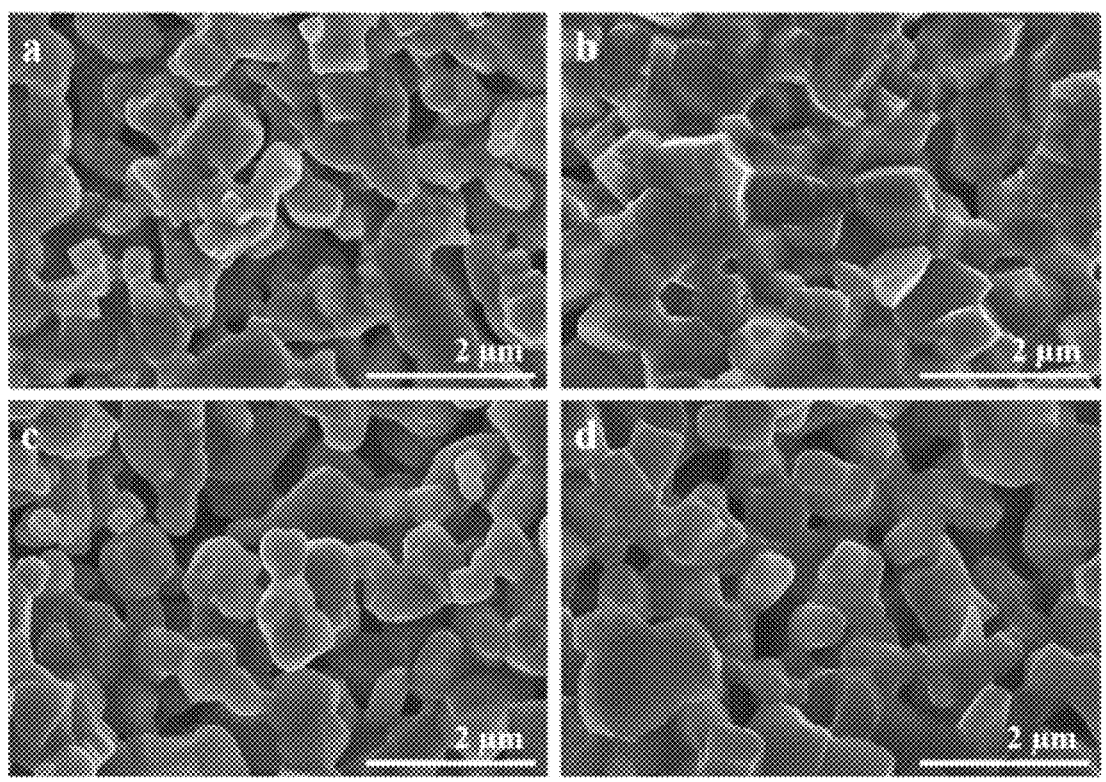
FIG. 5 presents SEM images of several PCC pellet cross-sections.
Figure 6:
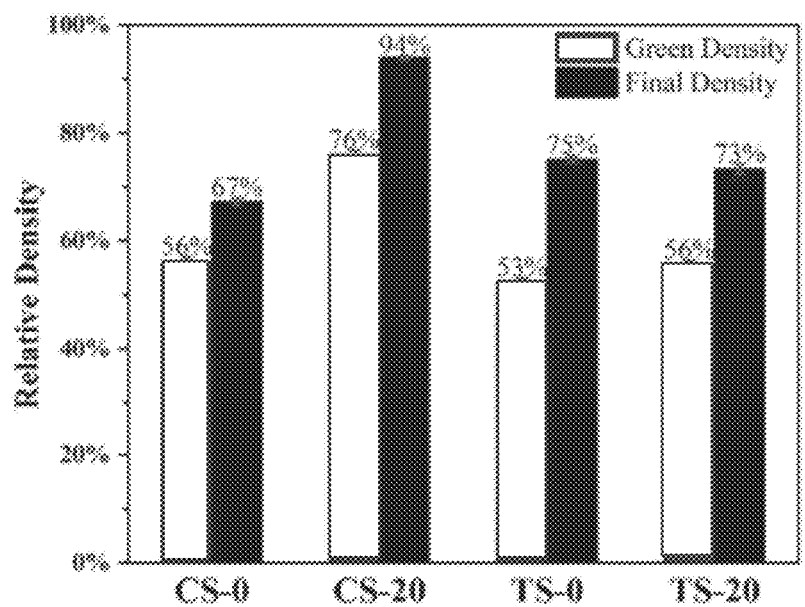
FIG. 6 presents a summary of relative densities (calculated by the geometric measurement) for PCC pellets shown in FIG. 5.
Figure 7:
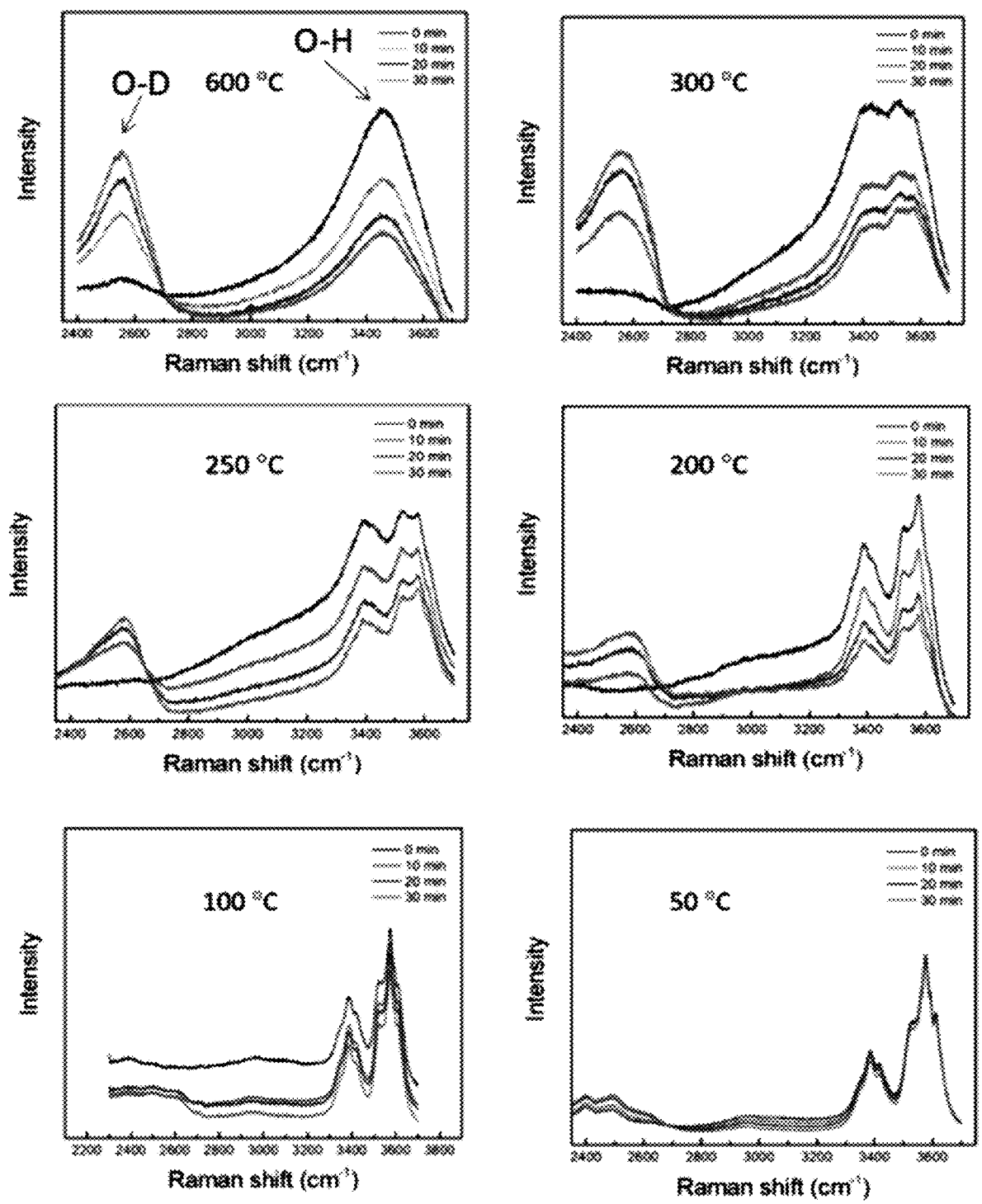
FIG. 7 presents Raman spectra for deuterium/protium isotope exchange for different exchange time periods at different temperatures by use of a separation phase as described herein.

As-synthesized BZY20 powder formed as described above was mixed with either 20 wt. % water or with no water addition as described above with final sinter at 1500° C. for 12 h. Two samples (one with water added (CS-20) and one with no water (CS-0)) were formed with cold sintering pretreatment including pressing under about 400 MPa at room temperature for 10 min., followed by setting the die to 180° C. with a ramp rate of 10° C./min by a heating tape and held for 1 h under the same pressure. Two samples were formed with no pretreatment (TS-20 and TS-0). All four samples were finally sintered at 1500° C. for 12 hours FIG. 5 provides SEMs of cross-sections of CS-0 (a), CS-20 (b), TS-0 (c) and TS-20 (d). The green density histograms in FIG. 6 provide the relative densities of the BZY20 green pellets. As shown, the CS-20 BZY20 green pellet after cold sintering with 20 wt. % water at 180° C. showed a relative density of about 76%, which was higher than the theoretical packing density of the cubic close-packing structure (about 74%) based on equal spheres. The three other BZY20 green pellets of CS-0 (cold sintering without water), TS-0 (traditional pressing without water), and TS-20 (traditional pressing without 20 wt. % water) showed relative densities much lower than the one for CS-20 green pellet (53-56% vs. 76%). Since the high relative density for the green pellets usually resulted in high relative density for the sintered pellets, it was expected to achieve high relative density for the BZY20 pellets pretreated by cold sintering with 20 wt. % at 180° C.

The CS-20 BZY20 pellet did not show any obvious pores suggesting the high relative density. All the other three BZV20 pellets (CS-0, TS-0, and TS-20) showed visible pores in the SEM micrographs in line with low relative densities. Further comparison of these four pellets' microstructures indicated that the sintered CS-20 pellets have grain sizes about 1 µm, almost twice those for the other three samples. Therefore, it was concluded that the cold sintering pretreatment with 20 wt. % water at 180° C. for 1 h efficiently assisted the sintering process of the BZV20 pellets, which allowed the densification of the refractory BZY20. The densification temperature was lowered by about 200° C. compared to the traditional sintering method.

The final density histograms in FIG. 6 summarize the relative densities of the BZV20 pellets after the subsequent sintering at 1500° C. for 12 h. The CS-0, TS-0, and TS-20 BZV20 pellets after sintering resulted in much lower relative densities of 67%, 75%, and 73%, respectively. After a longer pressing process and higher temperature, the density of CS-0 was higher than TS-0 (results not shown). It is believed that for TS-20, the addition of 20 wt. % H$_2$O might help to improve the packing density after 10 min pressing comparing with TS-0. Once the final 1500° C. sintering was conducted, the extra water left without leaving any improvement as showing the similar relative density with TS-0 considering experimental error (gray bar in FIG. 6). In other words, the additional 20 wt % H$_2$O in the room temperature pressing did not affect the final relative density even though it may lead to some improvement for the density of green pellet. When cold sintering was applied, the added water could strongly interact with BZY20 powders rather than simple physical absorption. The CS-20 BZY20 pellets achieved a relative density as high as about 94% after the final sintering, consistent with its high green relative density, homogeneous and compact microstructure.

Example 3

Measurements of the isotopic separation factors were obtained using in-situ Raman spectroscopy in nanocrystalline BaCe$_{0.7}$Zr$_{0.1}$Y$_{0.4}$Yb$_{0.1}$O$_{3-\delta}$ (BCZYYb). A method as described in Example 1 was used to synthesis the nano-BCZYYb powder, and a dry press method was applied to fabricate a nanostructure membrane without high temperature sintering.

The isotope exchange measurements were performed in a water-cooled hot stage (Linkam TS1500, Horiba) by flowing argon through bubblers with mixed D$_2$O and H$_2$O at different temperatures to control the water vapor content.

The isotopic ratios in the solid in equilibrium with the given liquid phase ratios are shown in Table 1, below. The Raman shift ranged from 2000 cm$^{-1}$ to 4000 cm$^{-1}$ under 3% H$_2$O or D$_2$O humidified air.

TABLE 1

| Temperature | 50:50 D:H | 20:80 D:H |
| --- | --- | --- |
| 25 | 1:1.20 | 1:2.02 |
| 100 | 1:1.59 | 1:2.35 |

TABLE 1-continued

| Temperature | 50:50 D:H | 20:80 D:H |
|---|---|---|
| 200 | 1:2.42 | 1:4.60 |
| 300 | 1:2.75 | 1:5.41 |

Figure 8:
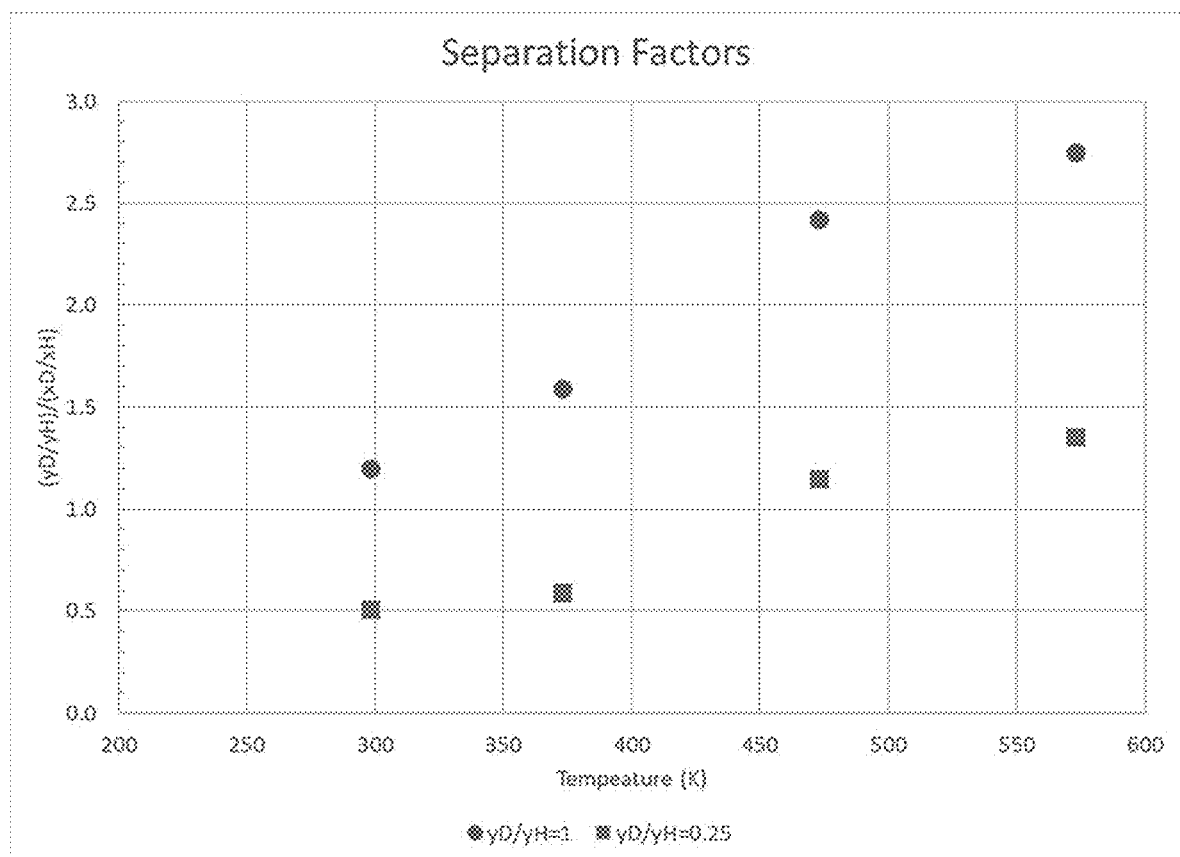
FIG. 8 provides measured separation ratios converted to separation factors for a separation phase at a variety of temperatures 25 to 300° C.

The isotopic ratios of Table 1 are converted into separation factors and shown in FIG. 8, with y representing the mole fraction in the fluid phase and x the mole fraction in the solid phase. Although these initial separation factors were not constant with fluid phase composition, they show a consistent trend with temperature.

For the yD/yH=0.25 case, the separation factor crosses unity. This behavior is ideal for separation processes. At 25° C. (298K), the separation factor is 0.505, while it is 1.35 at 300° C. (573K).

Figure 9:
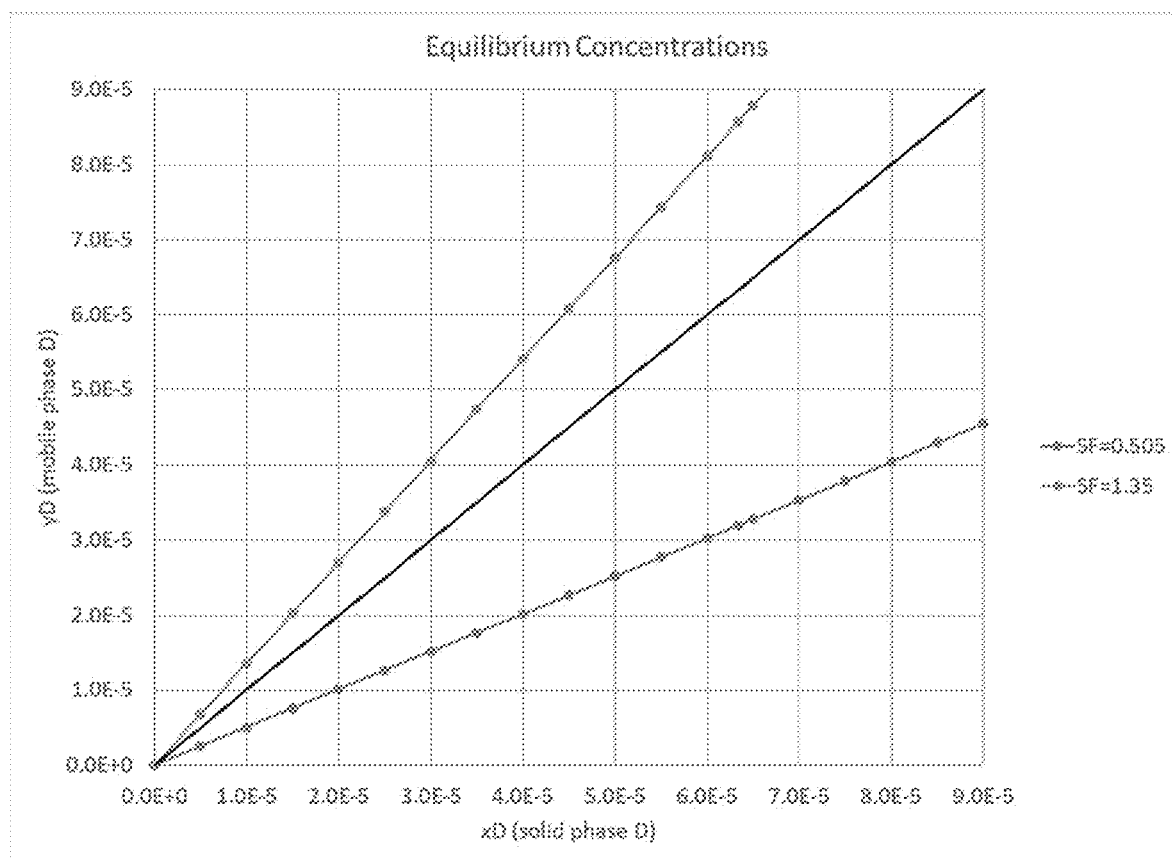
FIG. 9 illustrates deuterium/hydrogen equilibrium compositions for constant separation factors at different temperatures for a separation phase as described herein.

FIG. 9 shows the equilibrium concentration profiles if these separation factors were constant at fluid phase compositions below 20:80 D:H. From the concentration profiles, a bed operating at separation factor below 1.0 will have a solid phase enriched in the heavier isotope, and one operating at a separation factor above 1.0 will have a lean solid phase.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A process for removal of a heavy hydrogen isotope from an aqueous stream, the process comprising:
    contacting a hydrated separation phase with a first aqueous stream comprising the heavy hydrogen isotope, wherein the first aqueous stream is at a temperature of about 100° C. or less, the hydrated separation phase comprising a proton-conducting ceramic having an average grain size of about 500 nm or less, wherein upon the contact, the heavy hydrogen isotope of the first aqueous stream is exchanged with a first lighter hydrogen isotope of the hydrated separation phase and adsorbed to the hydrated separation phase, thereby purifying the first aqueous stream;
    subsequently, contacting the hydrated separation phase comprising the adsorbed heavy hydrogen isotope with a second aqueous stream, wherein the second aqueous stream is at a temperature that is greater than that of the first aqueous stream, wherein upon the subsequent contact, the adsorbed heavy hydrogen isotope of the hydrated separation phase is exchanged with a second lighter hydrogen isotope of the second aqueous stream.

2. The process of claim 1, wherein the hydrated separation phase is free of any hydrogen isotope exchange catalyst.

3. The process of claim 1, wherein the heavy hydrogen isotope comprises tritium, the first lighter hydrogen isotope comprises protium, and the second lighter hydrogen isotope comprises protium.

4. The process of claim 3, wherein the first lighter hydrogen isotope comprises deuterium and/or the second lighter hydrogen isotope comprises deuterium.

5. The process of claim 1, wherein the first aqueous stream comprises liquid water or water vapor.

6. The process of claim 1, wherein the second aqueous stream comprises steam.

7. The process of claim 6, wherein the second aqueous stream comprises superheated steam.

8. The process of claim 6, further comprising condensing the steam following the subsequent contact of the hydrated separation phase with the second aqueous stream.

9. The process of claim 1, wherein the proton-conducting ceramic comprises a doped perovskite.

10. A system for removal of a heavy hydrogen isotope from an aqueous stream, the system comprising:
    a first column containing a hydrated separation phase within an interior volume, the hydrated separation phase comprising a proton-conducting ceramic having an average grain size of about 500 nm or less, the first column including a first inlet configured for receiving a first aqueous stream and a first outlet configured for exit of the first aqueous stream following contact with the hydrated separation phase, the column further comprising a second inlet configured for receiving a second aqueous stream, and a second outlet configured for exit of the second aqueous stream following contact with the hydrated separation phase.

11. The system of claim 10, wherein the hydrated separation phase comprises a packed bed, the packed bed comprising a plurality of sintered pellets comprising the doped perovskite ceramic.

12. The system of claim 10, wherein the hydrated separation phase comprises a membrane, the membrane comprising the doped perovskite ceramic.

13. The system of claim 10, further comprising a condenser in fluid contact with the second outlet.

14. The system of claim 10, wherein the interior volume of the first column is at a saturated water vapor pressure with the hydrated separation phase.

15. The system of claim 10, further comprising a second column, wherein the second column is configured for parallel operation with the first column.

16. The system of claim 15, wherein the second column is configured for countercurrent operation to the first column.

17. The system of claim 10, wherein the proton-conducting ceramic comprises a doped perovskite having the general composition $$A_{1-x-\alpha}P_xB_{1-y}Q_yO_{3-\delta}$$

in which
    A comprises Ba, Sr, Ca or Mg or combinations thereof,
    P comprises a lanthanide,
    B comprises Ti, Zr, a lanthanide, or a combination thereof,
    Q comprises Sc, Y, a lanthanide, or a combination thereof
    $\alpha$ represents any A-site non-stoichiometry deficiency, and
    $\delta$ represents any oxygen deficiency.

18. The system of claim 10, wherein the proton-conducting ceramic comprises $BaZrO_3$, $BaZr_{0.25}In_{0.75}O_{3-\delta}$, $BaZr_{0.9}Y_{0.1}O_3$, $BaZr_{0.85}Y_{0.15}O_3$, $Ba_{0.97}Zr_{0.77}Y_{0.19}Zn_{0.04}O_3$, $BaZr_{0.5}In_{0.5}O_{3-\delta}$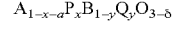$BaCeO_3$, $BaZr_{0.1}Ce_{0.7}Y_{0.2}O_{3-\delta}$, $BaCe_{0.9}Gd_{0.1}O_3$, $BaCe_{0.8}Zr_{0.1}Gd_{0.1}O_3$, $BaCe_{0.45}Zr_{0.45}Sc_{0.1}O_3$, $BaCe_{0.65}Zr_{0.20}Y_{0.15}O_{3-\delta}$, $BaCe_{0.9}Y_{0.1}O_{2.95}$, $BaCe_{0.8}Y_{0.2-x}Nd_xO_{3-\delta}$ (x=0-0.15), $Ba_{0.5}Sr_{0.5}Ce_{0.6}Zr_{0.2}Gd_{0.1}Y_{0.1}O_{3-\delta}$, $BaSn_{0.5}In_{0.5}O_{2.75}$, $Ba_{0.9}La_{0.1}Sn_{0.5}In_{0.5}O_{2.8}$, $Ba_{0.9}Gd_{0.1}Sn_{0.5}In_{0.5}O_{2.8}$, $SrCeO_3$, $SrCe_{0.95}Yb_{0.05}O_3$, $Sr_3CaZr_{0.5}Ta_{1.5}O_{8.75}$, $CaZrO_3$, $SrZrO_3$, $BaTiO_3$ $Ce_{0.9}Gd_{0.1}O_{2-\delta}$, or any combination thereof.

19. The system of claim 10, wherein the proton-conducting ceramic comprises $BaZr_{0.5}Y_{0.2}O_{3-\delta}$ or $BaCe_{0.7}Zr_{0.1}Y_{0.1}Yb_{0.1}O_{3-\delta}$.

20. The system of claim 10, wherein the separation phase is free of any hydrogen isotope exchange catalyst.

* * * * *